April 2, 1963 N. B. OWEN 3,083,850
CARRIER FOR HANDLING RECEPTACLES
Filed Aug. 21, 1961 5 Sheets-Sheet 1
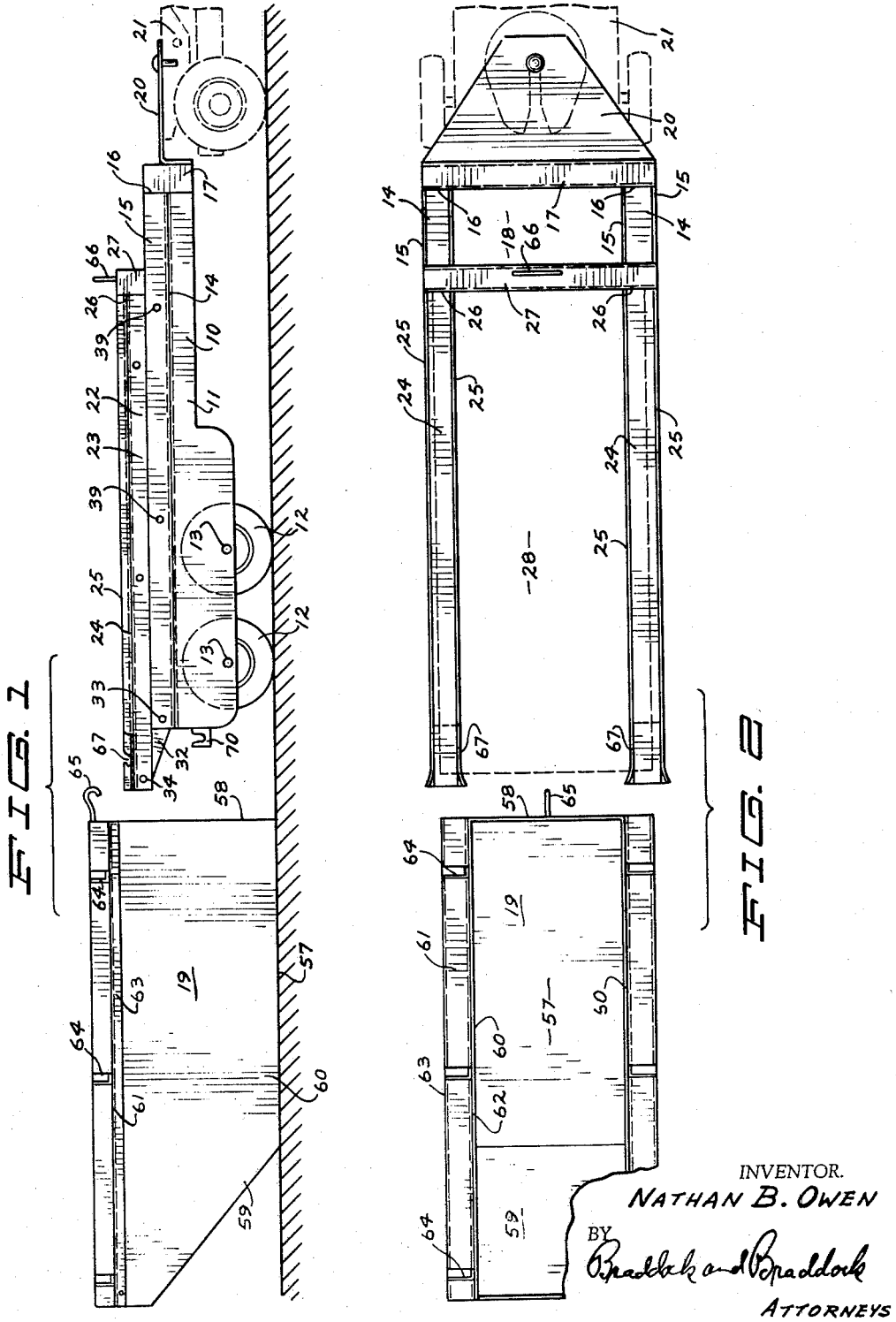
INVENTOR.
NATHAN B. OWEN
BY Braddock and Braddock
ATTORNEYS April 2, 1963
N. B. OWEN
3,083,850
CARRIER FOR HANDLING RECEPTACLES
Filed Aug. 21, 1961
5 Sheets-Sheet 2
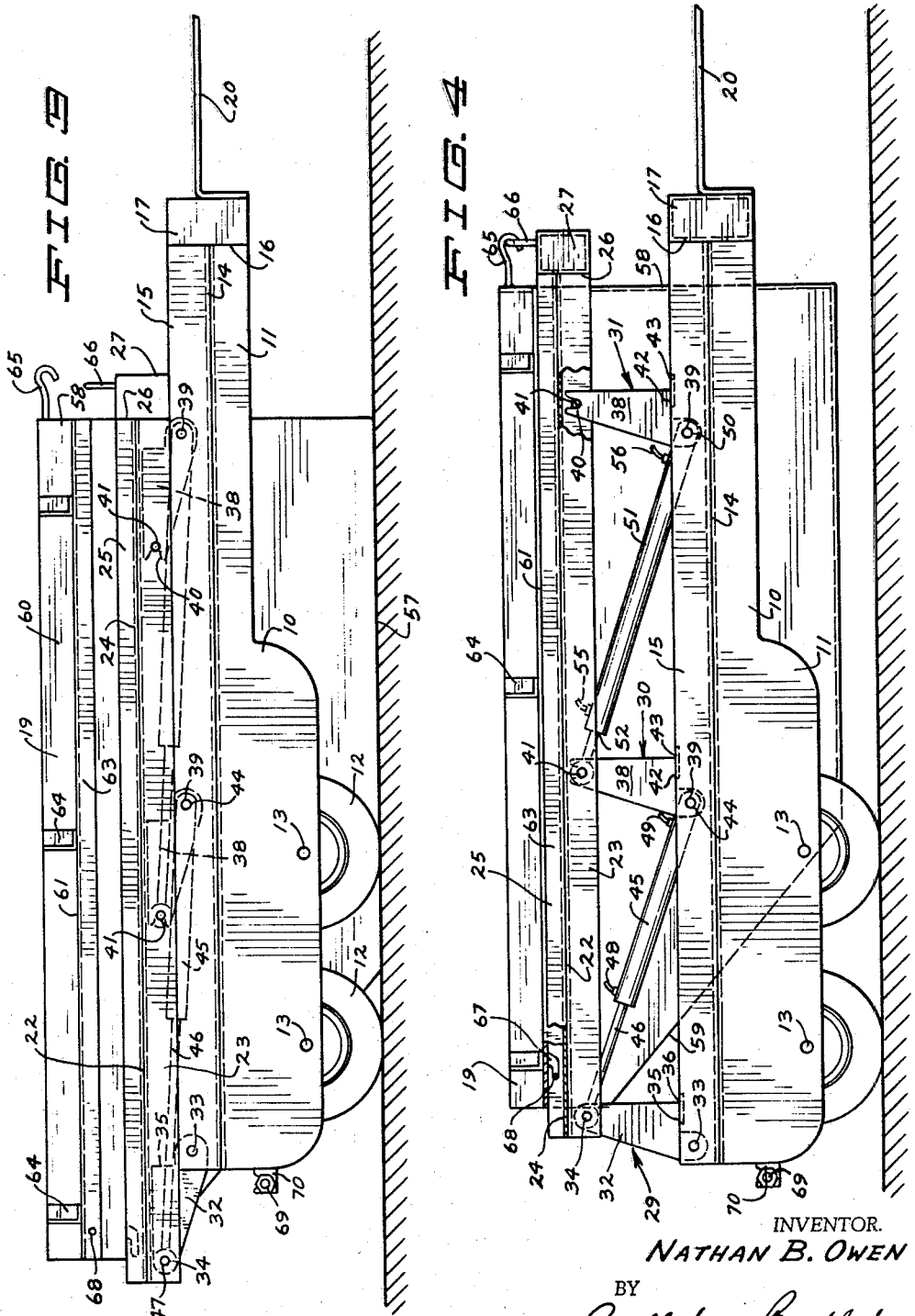
INVENTOR.
NATHAN B. OWEN
BY
Braddock and Braddock
ATTORNEYS April 2, 1963 N. B. OWEN 3,083,850
CARRIER FOR HANDLING RECEPTACLES
Filed Aug. 21, 1961 5 Sheets-Sheet 3
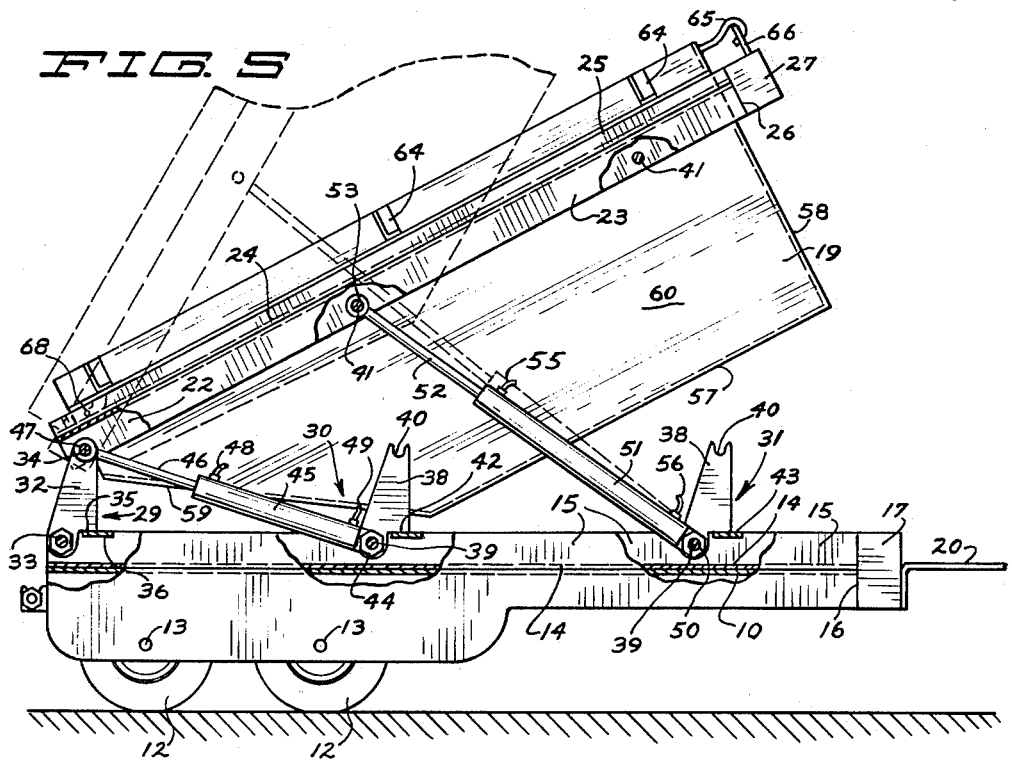
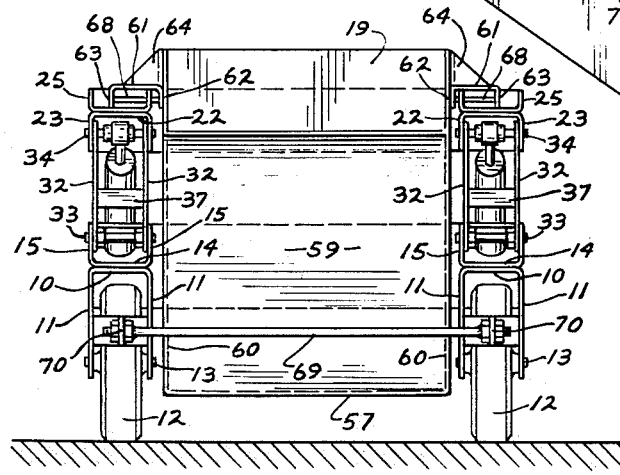
INVENTOR.
NATHAN B. OWEN
BY Braddock and Braddock
ATTORNEYS

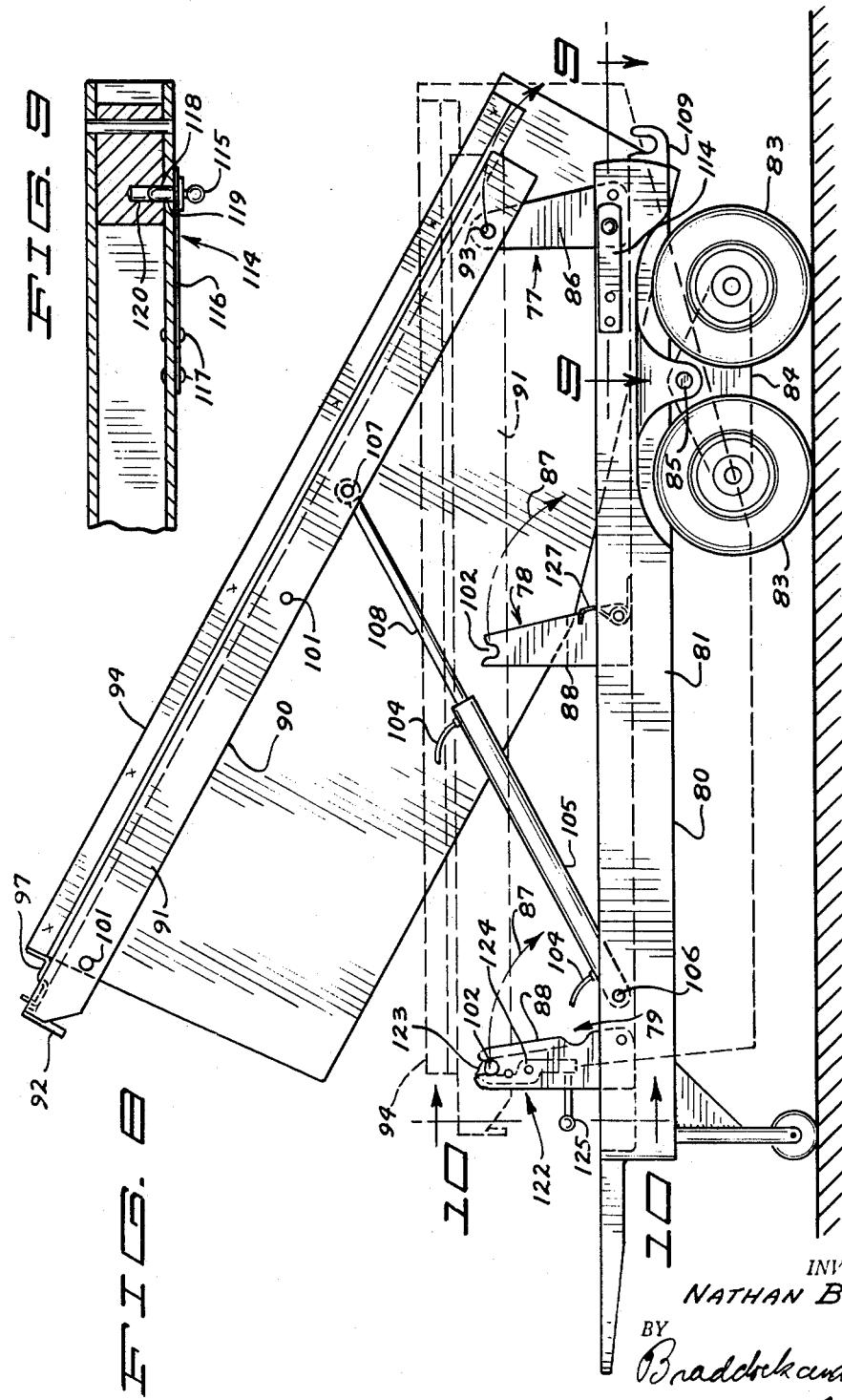

April 2, 1963

N. B. OWEN 3,083,850

CARRIER FOR HANDLING RECEPTACLES

Filed Aug. 21, 1961

INVENTOR.
NATHAN B. OWEN
BY
Braddock and Braddock
ATTORNEYS

United States Patent Office 3,083,850
Patented Apr. 2, 1963

3,083,850
CARRIER FOR HANDLING RECEPTACLES
Nathan B. Owen, Minneapolis, Minn., assignor to A.B.C. Corporation, Minneapolis, Minn., a corporation of Minnesota
Filed Aug. 21, 1961, Ser. No. 132,986
15 Claims. (Cl. 214—390)

This application is a continuation-in-part of my application for Vehicle With Mechanism for Handling Receptacles, Serial No. 734,696, filed May 12, 1958.

The invention herein has relation to a trailer vehicle with a lifting and dumping mechanism for handling receptacles, that allows an operator to pick them up, transport them and dump them, and deposit them when empty.

The device shown in the present invention may be used for loading and hauling special receptacles or load boxes that are designed to carry a number of different items. Some of the receptacles may be used for handling scrap metal. The load box may be left at the point of loading while the carrier vehicle is used to remove other loaded boxes. Special containers may also be used for loading fruit. The empty fruit containers may be left in the field and easily picked up by the carrier when they are full. Materials such as bin flour, sugar, cement or tanks of liquids, even refrigerated containers with built in compressors can be easily and economically handled with the carrier. The arrangement makes an excellent device for utilizing the "piggy-back" system for long distance hauling on railroad flat cars. The containers are left on the flat cars and the vehicle itself is not tied up in any way. The containers are not subject to the bouncing that occurs when supported by rubber tires, as with the ordinary semi-trailer that is used in the "piggy-back" operation.

A man, using a single tractor and carrier vehicle, thus can utilize a number of containers to insure economical transportation of commodities and products.

The carrier may also be used in the handling of missiles, or large items that are to be loaded into cargo planes.

The carrier has a base frame and a vertically movable and tiltable upper frame. The frames are vertically aligned and open toward the rear and are positioned substantially surrounding the load box or container carried. Power means are provided to raise the upper frame to engage supports on the load box and thus to lift the box so that it clears the ground. The upper frame of the vehicle will tilt to dump the load box. The upper frame is lowered to set the container on the ground in its desired location. In this manner, the container or receptacle can be loaded and may easily be lifted and moved by the transport vehicle.

The purpose of the invention is to provide a carrier with mechanism for picking up, transporting, dumping and depositing a receptacle which will be of simple, inexpensive, practical, novel and improved construction.

In the drawings,

FIG. 1 is a side elevational view of a carrier with mechanism made according to a first form of the invention, also disclosing a receptacle or load box to be picked up, transported, dumped and deposited by employment of the carrier;

FIG. 2 is a top plan view of the disclosure of FIG. 1;

FIG. 3 is an enlarged side elevational view of the carrier with mechanism as when beneath and vertically aligned with a receptacle or load box which the carrier is to transport;

FIG. 4 is a view corresponding with the disclosure of FIG. 3 showing the receptacle or load box as when lifted from the ground and supported upon the carrier;

FIG. 5 is a side elevational view, partially in section and partially broken away, of the carrier with mechanism disclosing a vertically movable and tiltable frame of the carrier as when in position to cause a receptacle or load box upon the vertically movable and tiltable frame to be dumped;

FIG. 6 is a rear elevational view of the carrier with mechanism and a receptacle or load box thereon as said vehicle and receptacle or load box would appear from the left in FIG. 4;

FIG. 7 is a perspective view of a receptacle of modified construction which the vehicle with mechanism has been devised to be capable of handling;

FIG. 8 is a side elevational view of a second form of the present invention showing a vertically movable and tiltable frame in a dumping position, actuated by one pair of hydraulic cylinders;

FIG. 9 is a sectional view taken as on line 9—9 in FIG. 8;

Figure 10:
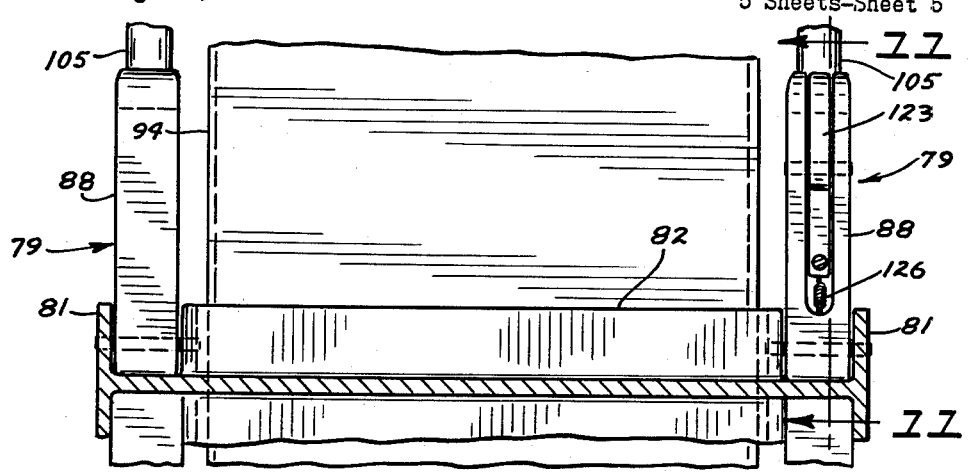
FIG. 10 is a vertical sectional view taken as on line 10—10 in FIG. 8.

Referring to FIGS. 1 through 7 and a first form of the present invention disclosed therein, an elongated main frame of the carrier with mechanism for handling receptacles includes parallel, transversely spaced, longitudinally extending lower channel members, each denoted 10. The body of each of the lower channel members 10 is horizontally disposed, and parallel flanges, each indicated 11, of each of said lower channel members are integral with and extend downwardly from opposite side edges of the body thereof in perpendicular relation to said body.

Rearward portions of the lower channel members 10 are supported upon forward and rearward idler wheels 12 situated between the downwardly extending flanges 11 of the different lower channel members 10, respectively, and mounted upon axles 13 supported in said downwardly extending flanges. Forward and rearward wheels at the same side of the carrier or vehicle are in spaced, longitudinal alignment and forward and rearward wheels, respectively, at opposite sides of said vehicle are in transverse alignment.

The elongated main frame of the carrier also includes parallel, transversely spaced, longitudinally extending upper channel members, each represented 14. The body of each of the upper channel members 14 is horizontally disposed, and parallel flanges, each designated 15, of each of the upper channel members 14 are integral with and extend upwardly from opposite side edges of the body thereof in perpendicular relation to said body.

The lower and upper channel members at each side of the elongated main frame are in vertical and longitudinal alignment. The flat upper surface of the body of each lower channel member 10 is welded to the flat lower surface of the body of the upper channel member 14 at the corresponding side of the main frame, the downwardly and upwardly extending flanges 11 and 15 of lower and upper channel members 10 and 14, respectively, at the same side of said elongated main frame are in vertical and longitudinal alignment, and the opposite ends, respectively, of all of the lower and upper channel members 10, 14 are in alignment transversely of the elongated main frame.

The lower and upper channel members 10 and 14 at the opposite sides, respectively, of the main frame provide spaced, parallel, elongated side frame members of said main frame, and the forward ends of said elongated side frame members are welded, as at 16, to a transverse frame member 17 of the main frame in the plane of the elongated side frame members. Together, the elongated side frame members and the transverse frame member 17 of said main frame bound or define a rectilinear space 18, open at an end thereof, for receiving a receptacle, such as a load box 19, to be transported.

As disclosed, the carrier for handling receptacles is constituted as a trailer. A hitch 20 rigid with the transverse frame member 17 is for detachably connecting the elongated main frame of the trailer with a tractor 21, or other towing vehicles. A carrier constructed and equipped according to the invention could just as well be a truck, or other unitary vehicle. Also, a carrier with mechanism according to the invention can be vertically aligned with a receptacle to be transported either by backing up or advancing the carrier. Stated otherwise, a rectilinear space, such as 18, for receiving a receptacle, such as 19, to be transported could be open at the front of the transporting vehicle instead of at the rear thereof.

An elongated vertically movable and tiltable frame of the carrier includes parallel, transversely spaced, longitudinally extending lower channel members, each represented 22. The body of each of the lower channel members 22 normally is horizontally disposed, and parallel flanges, each indicated 23, of each of the lower channel members 22 are integral with and extend downwardly from opposite side edges of the body thereof in perpendicular relation to said body.

The elongated vertically movable and tiltable frame also includes parallel, transversely spaced, longitudinally extending upper channel members, each represented 24. The body of each of the upper channel members 24 normally is horizontally disposed, and parallel flanges, each denoted 25, of each of the upper channel members 24 are integral with and extend upwardly from opposite side edges of the body thereof in perpendicular relation to said body.

The lower and upper channel members at each of the opposite sides of the elongated vertically movable and tiltable frame are in vertical and longitudinal alignment with each other, as well as in vertical alignment with the lower and upper channel members of the main frame at the corresponding side thereof. The flat upper surface of the body of each lower channel member 22 is welded to the flat lower surface of the body of the upper channel member 24 at the same side of the frame, the downwardly and upwardly extending flanges 23 and 25 of lower and upper channel members 22 and 24 respectively, at the same side of said vertically movable and tiltable frame are in vertical and longitudinal alignment with each other, as well as in vertical alignment with downwardly and upwardly extending flanges 11 and 15 of the channel members 10 and 14 of the main frame, and the opposite ends, respectively, of all of the lower and upper channel members 22, 24 are in alinement transversely of the elongated vertically movable and tiltable frame. As shown, the rearward end of said vertically movable and tiltable frame is disposed somewhat rearwardly of the rearward end of said main frame when the vertically movable and tiltable frame is in a lower position and somewhat forwardly of said rearward end of the main frame when said vertically movable and tiltable frame is in an upper position.

The lower and upper channel members 22 and 24 at the opposite sides, respectively, of the vertically movable and tiltable frame provide spaced, parallel, elongated side frame members of said vertically movable and tiltable frame, and the forward ends of said elongated side frame members are welded, as at 26, to a transverse frame member 27 of the vertically movable and tiltable frame in the plane of the elongated side frame members. Together, the elongated side frame members and the transverse frame member 27 of said vertically movable and tiltable frame bound or define a rectilinear space 28, open at an end thereof, the rearward end as disclosed, for receiving a receptacle or load box, such as 19, to be transported. The rectilinear space 28 bounded or defined by the vertically movable and tiltable frame is vertically aligned with the rectilinear space 18 bounded or defined by said main frame, and the transverse frame member 27 of said vertically movable and tiltable frame is disposed forwardly of the transverse frame member 17 of the main frame.

Transversely spaced and aligned actuators, each denoted 29, of a first set of actuators are adjacent to the open ends, the rearward ends as shown, of the main frame and the vertically movable and tiltable frame of the vehicle. Transversely spaced and aligned actuators, each indicated 30, of a second set of actuators are in spaced relation to the first set of actuators 29 at the side thereof adjacent to the transverse frame members 17 and 27 of the main frame and the vertically movable and tiltable frame, respectively. Transversely spaced and aligned actuators, each represented 31, of a third set of actuators are in spaced relation to and at the side of the second set of actuators 30 adjacent to said transverse frame members. As disclosed, the actuators 30 are near the midlengths of the side frame members at the side of said midlengths adjacent to the actuators 29, the actuators 31 are near the transverse frame members, between said transverse frame members and the actuators 30, and the sets of actuators 29 and 31 are in equally spaced relation to the set of actuators 30.

Each actuator 29 is constituted as a pair of parallel transversely spaced and alined arms 32 disposed in vertical planes. Parts of inner end portions of the arms 32 of each actuator 29 at the sides thereof adjacent to the open ends of the frame members when said arms are upright are situated between the upwardly extending flanges 15 of the upper channel member 14 of the main frame at the same side of the vehicle and pivotally mounted on a cross pin 33 having its opposite end portions secured in said upwardly extending flanges 15. Outer ends of the arms 32 of each actuator 29 are situated between the downwardly extending flanges 23 of the lower channel member 22 of the vertically movable and tiltable frame at the corresponding side of the carrier and pivotally mounted upon a cross pin 34 having its opposite end portions secured in said downwardly extending flanges 23. The arms 32 of each actuator 29 are swingable between a horizontal position, as in FIGS. 1 and 3 of the drawings, where the major portions of said arms are situated exteriorly of the open end of the main frame of the carrier, and an upright position, as in FIGS. 4, 5 and 6, where flat surfaces 35 bounding or defining inner ends of portions of the arms at the sides thereof opposite the open ends of the frame members are, respectively, engaged against transverse supports 36 between and integral with upper portions of the upwardly extending flanges 15 of the upper channel members 14 of the main frame. A cross bar 37 is integral with and extends between intermediate portions of the arms 32 of each of the actuators 29.

The actuators 30 and 31 are of duplicate construction. Each is constituted as a pair of parallel, transversely spaced and aligned arms 38 disposed in vertical planes. Parts of inner end portions of the arms 38 of each of the actuators 30 and 31 at the sides thereof adjacent to the open ends of the frame members when said arms are upright are situated between the upwardly extending flanges 15 of the upper channel member 14 of the main frame at the same side of the vehicle and pivotally mounted on a cross pin 39 having its opposite end portions secured in said upwardly extending flanges 15. The outer end of each of the arms 38 of each of the actuators 30 and 31, situated between the downwardly extending flanges 23 of the lower channel members 22 of the vertically movable and tiltable frame at the corresponding side of the vehicle when said vertically movable and tiltable frame is in horizontal position, is provided with an outwardly facing part-cylindrical bearing seat 40. The part-cylindrical bearing seats 40 provided by the arms 38 of each of the actuators 30 and 31 are rotatably engageable with a cross pin 41 having its opposite end portions secured in the downwardly extending flanges 23 of the lower channel member 22 at the corresponding side of the vertically movable and tiltable frame. That is to say, the cross pins 41 and the part-cylindrical bearing seats 40 are rotatably and removably engageable with each other. The arms 38 of each of said actuators 30 and 31 are swingable between a horizontal position, as in FIG. 1 and 3, where said arms extend in direction toward the open ends of the frames, and an upright position, as in FIGS. 4, 5 and 6, where flat surfaces 42 bounding or defining inner ends of portions of the arms at the sides thereof opposite the open ends of said frames are, respectively, engaged against transverse supports 43 between and integral with upper portions of the upwardly extending flanges 15 of the upper channel members 14 of the main frame.

Each of the cross pins 39 which rotatably supports the arms 38 of an actuator 30 also rotatably supports, as at 44, the inner end of a hydraulic cylinder 45 situated between said arms 38 of the actuator at the corresponding side of the main frame. An inner end portion of a piston with connecting rod 46 is slidably mounted in each hydraulic cylinder 45, and the outer end of each connecting rod 46, between upper end portions of the arms 32 of the actuator 29 at the same side of the vertically movable and tiltable frame, is rotatably mounted, as at 47, upon the cross pin 34 at the corresponding side of said vertically movable and tiltable frame. First and second hoses, denoted 48 and 49, respectively, are for passage of hydraulic fluid into and out of the cylinders 45 at opposite sides of their pistons.

Each of the cross pins 39 which rotatably supports the arms 38 of an actuator 31 also rotatably supports, as at 50, the inner end of a hydraulic cylinder 51 situated between said arms 38 of the actuator at the same side of the main frame. An inner end portion of a piston with connecting rod 52 is slidably mounted in each hydraulic cylinder 51, and the outer end of each connecting rod 52, between the downwardly extending flanges 23 of the lower channel member 22 at the corresponding side of the vertically movable and tiltable frame, is rotatably mounted, as at 53, on a cross pin 41 engageable with arms 38 of an actuator 30 at the same side of the vertically movable and tiltable frame. First and second hoses, indicated 55 and 56, respectively, are for passage of hydraulic fluid into and out of the cylinder 51 at opposite sides of their pistons.

The receptacle or load box 19 is of rectilinear configuration. As shown, a bottom wall 57 of said receptacle or load box is rectangular, an end wall 58 of the receptacle or load box extends upwardly in perpendicular relation to its bottom wall, and an opposite end wall 59 of said receptacle or load box is in oblique relation to said bottom wall. Opposite side walls, each represented 60, of the receptacle or load box are parallel to each other and perpendicular to the bottom and opposite end walls. Each of channel members 61, at outer sides of upper portions of the opposite side walls 60, respectively, includes a horizontal body, a downwardly extending inner flange 62 welded to the corresponding side wall and an outer downwardly extending flange 63 in spaced relation to the inner downwardly extending flange. The inner and outer downwardly extending flanges 62 and 63 are perpendicular to the bodies of the channel members 61. Reinforcing gussets are designated 64.

A downwardly facing, outwardly extending, horizontal hook 65 on an upper central portion of the end wall 58 is for detachable engagement with an upwardly extending keeper 66 on a central portion of the upper surface of the transverse frame member 27 of the vertically movable and tiltable frame of the carrier.

Portions of the upwardly extending inner flanges 25 of the upper channel members 14, respectively, of the vertically movable and tiltable frame are provided with transversely aligned slots 67 to be entered by transversely aligned cross pieces 68 rigid with the inner and outer downwardly extending flanges of the channel members 61 on the opposite side walls 60, respectively, of the receptacle or load box 19.

A horizontal reinforcing rod or bar 69 can be employed. As shown, the rod or bar 69 extends transversely of the open end of the main frame and is detachably secured to and between anchoring elements 70 extending exteriorly of the opposite side frame members of said main frame. The purpose of the reinforcing rod 69 will be more fully explained in connection with the second form of the present invention.

The elongated side frame members of both the main frame and the vertically movable and tiltable frame of the carrier are spaced apart a distance greater than are the opposite side walls 60 of the of the receptacle or load box 19. In FIG. 1 of the drawings, the carrier and the receptacle or load box are in longitudinal alignment and spaced relation, and both are supported on the ground. In FIG. 3 the carrier has been rolled to position where the receptacle or load box is within the rectilinear spaces 18 and 28 provided by the main frame and the vertically movable and tiltable frame, respectively, and the channel members 61 on and at the opposite sides of said receptacle or load box are in vertical alignment with and above the elongated side frame members, respectively, of said vertically movable and tiltable frame which side frame members are in their lower position with the lower edges of the downwardly extending flanges 23 of the lower channel members 22 of the vertically movable and tiltable frame rested upon the upper edges of the upwardly extending flanges 15 of the upper channel members 14 of the main frame. In said FIG. 3 the channel members 61 on the receptacle or load box 19 are spaced from the upper channel members 24 a distance considerably less than a measurement representing the difference in height of said upper channel members 24 when in their lower and upper positions.

In FIGS. 4 and 6 the vertically movable and tiltable frame has been elevated to its upper position to engage the upper channel members 22 of said vertically movable and tiltable frame with the channel members 61 on the opposite side walls 60, respectively, of the receptacle or load box and lift said receptacle or load box from the ground. As will be clear from FIG. 6, the outer downwardly extending flanges 63 of said channel members 61 are rested on the bodies of the channel members 24, and the bodies of the channel members 61 are rested on the inner upwardly extending flanges 25 of said channel members 24 when the receptacle of load box is supported on the vehicle.

The cylinders 45 with pistons constitute means operable alone, or in cooperation with the cylinders 51 and their pistons, through the instrumentality of the actuators and the cross pins, for elevating the vertically movable and tiltable frame from its lower position, as in FIGS. 1 and 3, to its upper position, as in FIGS. 4 and 6. Also said cylinders 51 and their pistons are operable alone through the instrumentality of the actuators and cross pins to elevate the vertically movable and tiltable frame from its lower horizontal to its upper horizontal position. The pistons with connecting rods 46 and 52 are forced inwardly of the cylinders 45 and 51 to swing arms 32 and 38 of the actuators from their lower to their upright positions thus to cause said vertically movable and tiltable frame to be elevated. The connecting rods 46 and the arms 32 rotate on the cross pins 34, the connecting rods 52 rotate on cross pins 41 and the part-cylindrical bearing seats 40 provided by the arms 38 rotate relative to cross pins 41 during upward swinging movement of said arms 32 and 38. The arms 32 and 38 when upright are beyond dead center positions relative to the cross pins 33 and 29, respectively. Stated differently, said arms 32 and 38 when in upright position will be balanced toward the sides of the transverse supports 36 and 43, respectively, so that the load will be carried by said transverse supports. The cylinders and pistons carry none of the weight when the vertically movable and tiltable frame is in its upper position as in FIGS. 4 and 6.

It is apparent that mechanical, or non-hydraulic, means could be employed to elevate and lower the vertically movable and tiltable frame, but inasmuch as load boxes with loads are frequently extremely heavy, operation by employment of hydraulic means obviously is preferable.

In FIG. 5 of the drawings, the vertically movable and tiltable frame has been tilted to be situated in load dumping position. The pistons with connecting rods 46 are held stationary relative to their respective cylinders and the pistons with connecting rods 52 are forced outwardly of the hydraulic cylinder when dumping is to be accomplished.

The construction and arrangement will be such that the hook 65 will be clear of the keeper 66, and the cross pieces 68 will be clear of undercut parts of the slots 67, when the receptacle or load box is lifted by the vertically movable and tiltable frame. Said hook will engage said keeper, and said cross pieces will enter said slots, in response to sliding movement of said receptacle or load box due to tilting, and the construction and arrangement also will be such that the hook will become removed from the keeper, and the cross pieces will become removed from undercut parts of the slots, when said vertically movable and tiltable frame is lowered to set said receptacle or load box on the ground and release it from the vehicle. The hook and keeper, and the cross pins and slots, are for preventing removal of the receptacle or load box when the vertically movable and tiltable frame is tilted.

The receptacle or load box will be actuated from tilted to upper horizontal position and from upper horizontal position to lower horizontal position by performance of operations the reverse of those hereinbefore described.

In FIG. 7 there is disclosed a receptacle 75 of modified construction which the carrier is equipped to handle. The receptacle 75 is of rectilinear configuration. Channel members 76 on the opposite side walls of said receptacle are the equivalent of the channel members 61. Like the receptacle or load box 19, an upper portion of the receptacle 75 will extend above the vertically movable and tiltable frame members of the carrier when said receptacle is within rectilinear spaces such as 18 and 28 provided by said vehicle. The receptacle 75 could be employed to transport articles of different kinds, such, for example, as furniture, grain, etc.

Figure 11:
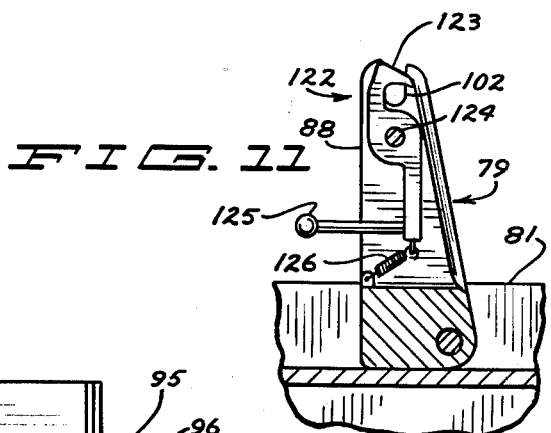
FIG. 11 is a sectional view taken as on line 11—11 in FIG. 10.
Figure 12:
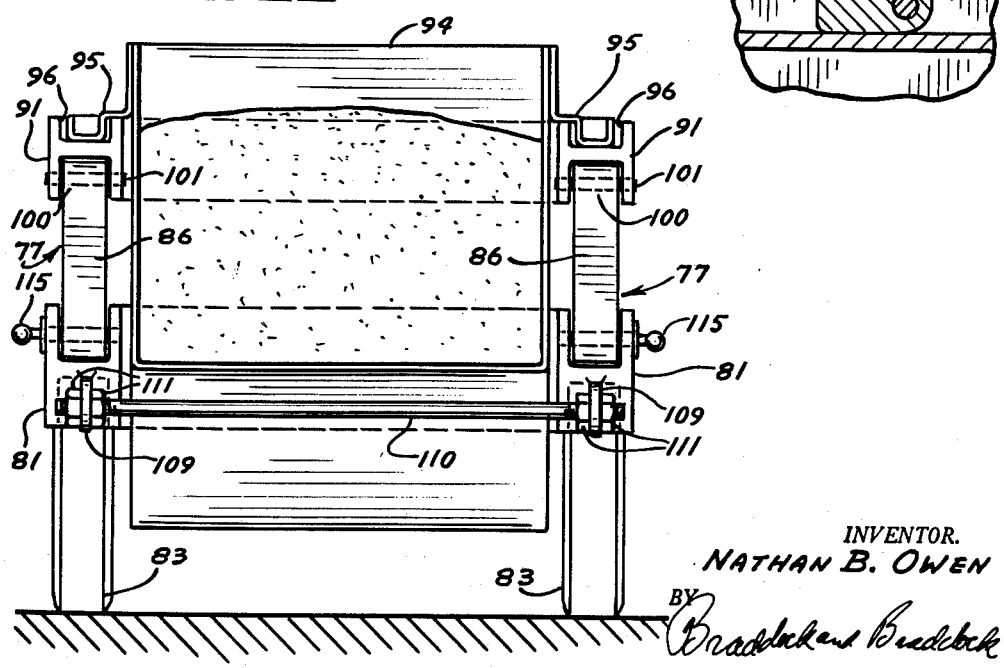
FIG. 12 is a rear elevational view of the device of FIG. 8, with a tiltable frame in its down position.

A second form of the present invention is illustrated in FIGS. 8 through 12. It operates substantially identical to the first form of the present invention.

A lower main frame member 80 has two longitudinally extending transversely spaced, I-beam shaped side members 81, 81 and a front cross member 82 extending between the side members. Transversely spaced tandem idler wheels 83, 83 are rotatably mounted on a walking beam 84 that is pivotally mounted to each of the side members 81, as at 85. A vertically movable and tiltable frame 90 has two longitudinally extending I-beam shaped side members 91, 91 and a front cross member 92. The rear ends of the frames are open.

A rear set of actuators 77 includes a pair of arms 86 that are pivotally mounted to the side members 81 of the lower frame 80 and are also pivotally mounted with respect to the side members 91, 91 as at 93. An intermediate set of actuators 78 and a front set of actuators 79 each have a pair of arms 88 that are pivotally mounted to the lower frame 81. The arms 88 and 86 may be parallelogrammed from an upright position with the vertically movable and tiltable frame in an upper horizontal position in direction as indicated by arrow 87 in FIG. 8 to a down position with the vertically movable and tiltable frame in a lower horizontal position, such as that shown in the first form of the invention. In the lower horizontal position, the side members 91, 91 of the vertically movable and tiltable frame 90 are immediately above and contiguous to the side members 81, 81 of the lower frame.

A load box 94 or other receptacle may be positioned in the area bounded by the side members of the upper and lower frames, and has longitudinal side supports or elements 95, 95 that fit into provided receptacles 96, 96 in the side members 91, 91 of the vertically movable and tiltable frame 90. A front cross support 97 is fixedly attached to the front of the load box 94 and fits in a provided receptacle in the front cross support 92. The support 97 prevents the load box from slipping rearwardly out of the carrier when the box is tilted.

When the tiltable frame is in its lower or down position, arms 86 and 88 fit partially within provided longitudinally extending receptacles 100, 100 in the side members 91, 91. A plurality of cross pins 101 are positioned in the side members 91, 91 and are located above the intermediate and forward arms 88. The cross pins are of configuration to fit into a part-cylindrical seat 102 that is defined in the upper end of each of the intermediate and forward arms 88. The pins 101 bear down onto the seats 102 and serve to support the load that is carried by the vertically movable and tiltable frame 90. When the vertically movable and tiltable frame is in its upper position, the actuator arms 86 and 88 go over center forwardly and seat against the lower frame members so that the movable frame will be supported in its upper position.

A pair of double-acting hydraulic cylinder piston assemblies 105, 105 are pivotally mounted, as at 106, to the lower frame 80 and each has a piston rod 108 that is fixedly attached with respect to an internal piston and extends rearwardly to pivotally engage one of the side members 91 of the vertically movable and tiltable frame 90, as at 107. Hydraulic fluid under pressure is provided through hoses 104, 104 selectively to opposite surfaces of the internal piston to either extend or retract the rod 108.

An anchoring element 109 is fixedly attached to the rear end portion of each of the side members 81 of the lower frame 80 and a reinforcing rod 110 is fixedly attached between the anchoring element. The reinforcing rod keeps the rear ends of the side members of the lower frame 80 from separating when the unit is backed up and serves to support and steady the unit when it is being trailed. The reinforcing rod greatly increases the stability of the trailer as it goes over rough ground. The reinforcing rod 110 can easily be slid into and out of the anchoring elements 109 by loosening a pair of lock nuts 111, 111, that are positioned on each end of the rod and clamp onto the anchoring elements. Through the use of two lock nuts 111, 111 at each anchoring element, the side members 81, 81 of the lower frame 80 are kept from moving toward each other as well as being kept from separating.

A releasable latch 114 is positioned on each of the rear arms 86 and has a handle 115 that is resiliently urged inwardly with a leaf spring 116 that in turn is fixedly attached, as at 117, to the respective side member 81 of the lower frame. A latch pin 118 is fixedly attached to the leaf spring 116 and extends through a provided hole 119 on the outer wall of the side member 81 and is of sufficient length to engage a receptacle 120 in its respective rear arm 86 whenever it is in the raised or upright position. This latch will then hold the rear arms in this raised position until they are manually released. The latches could be operated through the instrumentality of a hydraulic cylinder or an electric solenoid for remote control operation.

A front latch 122 is located on one of the forward arms 88. It consists of a latch hook 123 that is pivotally mounted, as at 124, to the desired forward arm 88. A handle 125 is used to manually release the latch hook 123. When the vertically movable, titlable frame 90 is positioned parallel to the lower frame 80, as indicated in dotted lines in FIG. 8, the forward pin 101 will go down into the receptacle 102 of the forward arm 88 and the latch hook 123 will yield to allow the pin 101 to seat in the receptacle. The hook 123 will move under the urging of a spring 126 to encircle the pin 101 and keep the frame 90 from again being tilted under the action of cylinders 105 until the latch hook has been manually released. A remote control arrangement, using either ropes, solenoids or hydraulic cylinders could also be arranged to actuate the latch hook.

The forward and intermediate pairs of arms 86 may have a torsion spring, such as 127, to resiliently urge the arms into upright position. This will insure that the arms will not rotate in direction as indicated by arrow 87 and go into the lower position when the vertically tiltable and movable frame 90 is tilted to dump a load from the box 94.

The second form of the present invention operates substantially identical to the first form of the invention. The carrier assembly, when it is to be used to carry a load box, or receptacle 94, is placed in its lowered position. The upper side members 91 will be resting against the lower side members 81 and will be in position substantially identical to the loading position shown in the first form of the invention in FIG. 3.

The carrier will be positioned so that the supports 95 on the sides of the box are aligned with the receptacles 96 in the side members 91 of the vertically movable and tiltable frame and front cross support 97 will be aligned with the front frame member 92. The hydraulic cylinder 105 will then be actuated to operate the actuators 77, 78 and 79 and pivot the arms 86 and 88 forwardly and upwardly. This will raise the vertically movable and tiltable frame so that the side members 91 of the frame engage the supports on the load box and raise the box from the ground into position as shown in dotted lines in FIG. 8. Each of the rear latches 114 will engage. The latch pins 118 enter the receptacles 120 in the rear arms 86. The frame is raised to this position by compressing the cylinder assembly 105, or in other words, moving the piston rod 108 inwardly under hydraulic pressure. With the load box 94 and the frame in this position the carrier can be moved with a suitable tractor or propelling device to its desired location. The reinforcing rod 110 will be installed in the anchoring elements 109 at the rear of the lower frame 80 and the lock nuts 111 will be clamped against the anchoring elements. This will keep the frame from separating and will help to support and steady the frame during the movement of the load.

If the load, for example, a load of gravel, is to be dumped, the operator will push downwardly on handle 125 to release the latch hook 123 from the pin 101. The cylinders 105 will be actuated so that the piston rods 108 extend outwardly. As the rear latches 114 prevent the arms 86 from rotating rearwardly in direction as indicated by arrow 87, the force from the cylinder will move the vertically movable and tiltable frame 90 about pivot 93 so that the frame will tilt upwardly and the load will slide toward the rear of the load box 94 and be dumped onto the ground at its desired location.

When the load box 94 has been emptied, the cylinder assembly 105 will be compressed or in other words the piston rod 108 will be moved inwardly in the cylinder and the vertically movable and tiltable frame will be lowered back into position, to rest on the arms 88. The latch hook 123 will again surround the forward pin 101 and will prevent the frame from tilting.

When the load box is to be left at a location for loading, the reinforcing rod 110 will be removed. Each of the latch pins 118 is pulled out of the receptacle 120 and the cylinder assembly 105 will be extended. As the frame can no longer tilt because of the holding action of latch hook 123, the arms 86 and 88 will rotate rearwardly in direction as indicated by the arrow 87 to their lowered position. The load box 94 will rest on the ground and the carrier frame can be pulled away, leaving the box resting on the ground.

In this manner the carrier can be used to transport a loaded box while other boxes are being filled. It also permits use of modular container units that can be deposited and left in one place until they are emptied or until they are completely loaded.

What is claimed is:

1. In a carrier for handling receptacles, a main frame, a vertically movable and tiltable frame on said main frame normally situated in a lower horizontal position, a first actuator pivotally securing said vertically movable and tiltable frame on said main frame for movement of the vertically movable and tiltable frame between its lower horizontal position and an upper horizontal position and between said upper horizontal position and a tilted position, a cross pin on said vertically movable and tiltable frame in spaced relation to said first actuator, a second actuator in spaced relation to the first actuator pivotally secured to said main frame and having an outwardly facing bearing seat engageable with said cross pin, and hydraulic means operable through the instrumentality of said first and second actuators and said cross pin to move the vertically movable and tiltable frame between its lower and upper horizontal positions and secondly operable to move said vertically movable and tiltable frame between its upper horizontal and tilted positions.

2. In a carrier for handling receptacles, a main frame including transversely spaced side frame members, transversely spaced wheels on which said side frame members of the main frame are supported, a vertically movable and tiltable frame on said main frame including transversely spaced side frame members, the side frame members of the main frame and the vertically movable and tiltable frame, respectively, bounding vertically aligned spaces therebetween accessible at an open end thereof to receive a receptacle to be transported and the side frame members of said vertically movable and tiltable frame normally being in a lower horizontal position to be situated below and in spaced relation to elements at the opposite sides of and rigid with said receptacle when ground supported and within said vertically aligned spaces, a first set of transversely spaced actuators pivotally securing the side frame members of the vertically movable and tiltable frame on the side frame members, respectively, of said main frame for movement of said vertically movable and tiltable frame between its lower horizontal position and an upper horizontal position where in engaged relation with said elements and lifting relation to said receptacle and between said upper horizontal position and a tilted position, cross pins on the side frame members, respectively, of said vertically movable and tiltable frame in spaced relation to the actuators of said first set, a second set of transversely spaced actuators in spaced relation to the first set of actuators pivotally secured to the side frame members, respectively, of the main frame and having outwardly facing bearing seats engageable with the cross pins on said side frame members, respectively, of the vertically movable and tiltable frame, and transversely spaced hydraulic means first operable through the instrumentality of the actuators of said first and second sets and said cross pins to move the vertically movable and tiltable frame between its lower and upper horizontal positions, and second operable to move said vertically movable and tiltable frame between its upper horizontal and tilted positions.

3. The combination as specified in claim 2, longitudinally spaced supports on the side frame members, respectively, of said main frame at the sides of the actuators of the first and second sets, respectively, opposite the open ends of said vertically aligned spaces, and said actuators being balanced toward and engaging said supports thus to maintain said vertically movable and tiltable frame in its upper horizontal position.

4. The combination as specified in claim 3, a reinforcing rod, and means releasably securing said reinforcing rod to the side frame members of said main frame at position adjacent the open end thereof.

5. In a carrier for handling receptacles, a main frame including transversely spaced side frame members, transversely spaced wheels on which said side frame members of the main frame are supported, a vertically movable and tiltable frame on said main frame including transversely spaced side frame members, the side frame members of the main frame and the vertically movable and tiltable frame, respectively, bounding vertically aligned spaces therebetween accessible at an open end thereof to receive a receptacle to be transported and the side frame members of said vertically movable and tiltable frame normally being in a lower horizontal position to be situated below and in spaced relation to elements at the opposite sides of and rigid with said receptacle when ground supported and within said vertically aligned spaces, a first set of transversely spaced actuators pivotally securing the side frame members of the vertically movable and tiltable frame on the side frame members, respectively, of said main frame for movement of said vertically movable and tiltable frame between its lower horizontal position and an upper horizontal position where in engaged relation with said elements and lifting relation to said receptacle and between said upper horizontal position and a tilted position, cross pins on the side frame members, respectively, of said vertically movable and tiltable frame in spaced relation to the actuators of said first set, a second set of transversely spaced actuators in spaced relation to the first set of actuators pivotally secured to the side frame members, respectively, of the main frame and having outwardly facing bearing seats engageable with the cross pins on said side frame members, respectively, of the vertically movable and tiltable frame, transversely spaced first hydraulic means operable through the instrumentality of the actuators of said first and second sets and said cross pins to move the vertically movable and tiltable frame between its lower and upper horizontal positions, and transversely spaced second hydraulic means operable to move said vertically movable and tiltable frame between its upper horizontal and tilted positions.

6. The combination as specified in claim 5, longitudinally spaced supports on the side frame members, respectively, of said main frame at the sides of the actuators of the first and second sets, respectively, opposite the open ends of said vertically aligned spaces, and said actuators being balanced toward and engaging said supports thus to maintain said vertically movable and tiltable frame in its upper horizontal position.

7. In a carrier for handling receptacles, a main frame including transversely spaced side frame members, transversely spaced wheels on which said side frame members of the main frame are supported, a vertically movable and tiltable frame on said main frame including transversely spaced side frame members, the side frame members of the main frame and the vertically movable and tiltable frame, respectively, bounding vertically aligned spaces therebetween accessible at an open end thereof to receive a receptacle to be transported and the side frame members of said vertically movable and tiltable frame normally being in a lower horizontal position to be situated below and in spaced relation to elements at the opposite sides of and rigid with said receptacle when ground supported and within said vertically aligned spaces, a first set of transversely spaced actuators adjacent to the open ends of said vertically aligned spaces pivotally securing the side frame members of the vertically movable and tiltable frame on the side frame members, respectively, of the main frame for movement of said vertically movable and tiltable frame between its lower horizontal position and an upper horizontal position where in engaged relation with said elements and lifting relation to said receptacle and between said upper horizontal position and a tilted position, cross pins on the side frame members, respectively, of said vertically movable and tiltable frame in spaced relation to the actuators of said first set at the sides thereof opposite said open ends of the vertically aligned spaces, a second set of transversely spaced actuators in spaced relation to the first set of actuators at the side thereof opposite the open ends of said vertically aligned spaces pivotally secured to the side frame members, respectively, of the main frame and having outwardly facing bearing seats engageable with the cross pins on the side frame members, respectively, of the vertically movable and tiltable frame, transversely spaced first hydraulic means pivotally connected between the side frame members of the main frame and the side frame members, respectively, of said vertically movable and tiltable frame operable through the instrumentality of the actuators of said first and second sets and said cross pins to move the vertically movable and tiltable frame between its lower and upper horizontal positions, and transversely spaced second hydraulic means operable to move said vertically movable and tiltable frame between its upper horizontal and tilted positions.

8. The combination as specified in claim 7, longitudinally spaced supports on the side frame members, respectively, of said main frame at the sides of the actuators of the first and second sets, respectively, opposite the open ends of said vertically aligned spaces, and said actuators being balanced toward and engaging said supports when said vertically movable and tiltable frame is in its upright horizontal position.

9. In a carrier for handling receptacles, a main frame, a vertically movable and tiltable frame on said main frame normally situated in a lower horizontal position, a first actuator pivotally securing said vertically movable and tiltable frame on said main frame for movement of the vertically movable and tiltable frame between its lower horizontal position and an upper horizontal position and between said upper horizontal position and a tilted position, a cross pin on said vertically movable and tiltable frame in spaced relation to said first actuator, a second actuator in spaced relation to the first actuator pivotally secured to said main frame and having an outwardly facing bearing seat engageable with said cross pin, first hydraulic means operable through the instrumentality of said first and second actuators and said cross pin to move the vertically movable and tiltable frame between its lower and upper horizontal positions, and second hydraulic means operable to move said vertically movable and tiltable frame between its upper horizontal and tilted positions.

10. In a carrier for handling receptacles, a main frame, a vertically movable and tiltable frame on said main frame normally situated in a lower horizontal position, a first actuator pivotally securing said vertically movable and tiltable frame on said main frame for movement of the vertically movable and tiltable frame between its lower horizontal position and upper horizontal position and between said upper horizontal position and a tilted position, a cross pin on said vertically movable and tiltable frame in spaced relation to said first actuator, a second actuator in spaced relation to the first actuator pivotally secured to said main frame and having an outwardly facing bearing seat engageable with said cross pin, first hydraulic means operable through the instrumentality of said first and second actuators and said cross pin to move the vertically movable and tiltable frame between its lower and upper horizontal positions, second hydraulic means operable to move said vertically movable and tiltable frame between its upper horizontal and tilted positions, and supports on the main frame at the sides of the pivotal supports for the actuators, respectively, on said main frame, said actuators being balanced toward and engaging said supports when the vertically movable and tiltable frame is in its upper horizontal position.

11. In a carrier for handling receptacles, a main frame, a vertically movable and tiltable frame on said main frame normally situated in a lower horizontal position, a first actuator pivotally securing said vertically movable and tiltable frame on said main frame for movement of the vertically movable and tiltable frame between its lower horizontal position and an upper horizontal position and between said upper horizontal position and a tilted position, a cross pin on said vertically movable and tiltable frame in spaced relationship to said first actuator, a second actuator in spaced relation to the first actuator pivotally secured to said main frame and having an outwardly facing bearing seat engageable with said cross pin, a hydraulic cylinder-piston assembly operable through the instrumentality of said first and second actuators and said cross pin, first to move the vertically movable and tiltable frame between its lower and upper horizontal positions and secondly operable to move said vertically movable and tiltable frame between its upper horizontal and tilted positions, and releasable means for fixedly positioning said first actuator with respect to said main frame when said vertically movable and tiltable frame is in its upper horizontal position.

12. In a carrier for handling receptacles, a main frame including transversely spaced side frame members, a vertically movable and tiltable frame on said main frame including spaced side frame members, the side frame members of the main frame and the vertically movable and tiltable frame, respectively, bounding vertically aligned spaces therebetween accessible at an open end thereof to receive a receptacle to be transported and the side frame members of said vertically movable and tiltable frame normally being in a lower horizontal position to be situated below and in spaced relation to elements at the opposite sides of and rigid with said receptacle when ground supported and within said vertically aligned spaces, a first set of transversely spaced actuators pivotally securing the side frame members of the vertically movable and tiltable frame to the side frame members, respectively, of said main frame for movement of said vertically movable and tiltable frame between its lower horizontal position and an upper horizontal position wherein said vertically movable and tiltable frame is in engaged relation with said elements and lifting relation to said receptacle and between said upper horizontal position and a tilted position, cross pins on the side frame members, respectively, of said vertically movable and tiltable frame in spaced relation to the actuators of said first set, a second set of transversely spaced actuators in spaced relation to the first set of actuators pivotally secured to the side frame members, respectively, of the main frame and having outwardly facing bearing seats engageable with the cross pins on said side frame members, respectively, of the vertically movable and tiltable frame, a pair of transversely spaced hydraulic cylinder-piston assemblies pivotally secured between the side frame members, respectively, of said main frame and the side frame members, respectively, of said vertically movable and tiltable frame, said hydraulic cylinder-piston assemblies being operable through the instrumentality of said actuators to move said vertically movable and tiltable frame from said lower horizontal position to said upper horizontal position, and releasable means for fixedly positioning said first set of actuators with respect to said main frame when said vertically movable and tiltable frame is in said upper position, said hydraulic cylinder-piston assemblies being operable to move said vertically movable and tiltable frame from said upper horizontal position to said tilted position when said first set of actuators is secured with respect to said main frame by said releasable means.

13. In a carrier for handling receptacles, a main frame including transversely spaced side frame members, a vertically movable and tiltable frame on said main frame including spaced side frame members, the side frame members of the main frame and the vertically movable and tiltable frame, respectively, bounding vertically aligned spaces therebetween accessible at an open end thereof to receive a receptacle to be transported and the side frame members of said vertically movable and tiltable frame normally being in a lower horizontal position to be situated below and in spaced relation to elements at the opposite sides of and rigid with said receptacle when ground supported and within said vertically aligned spaces, a first set of transversely spaced actuators pivotally securing the side frame members of the vertically movable and tiltable frame to the side frame members, respectively, of said main frame for movement of said vertically movable and tiltable frame between its lower horizontal position and an upper horizontal position wherein said vertically movable and tiltable frame is in engaged relation with said elements and lifting relation to said receptacle and between said upper horizontal position and a tilted position, cross pins on the side frame members, respectively, of said vertically movable and tiltable frame in spaced relation to the actuators of said first set, a second set of transversely spaced actuators in spaced relation to the first set of actuators pivotally secured to the side frame members, respectively, of the main frame and having outwardly facing bearing seats engageable with the cross pins on said side frame members, respectively, of the vertically movable and tiltable frame, a pair of transversely spaced hydraulic cylinder-piston assemblies pivotally secured between the side frame members, respectively, of said main frame and the side frame members, respectively, of said vertically movable and tiltable frame, said hydraulic cylinder-piston assemblies being operable through the instrumentality of said actuators to move said vertically movable and tiltable frame from said lower horizontal position to said upper horizontal position, first releasable means for fixedly positioning said first set of actuators with respect to said main frame when said vertically movable and tiltable frame is in said upper position, and second releasable means for pivotally securing at least one of said cross pins with respect to its associated second actuator, said hydraulic cylinder-piston assemblies being operable to move said vertically movable and tiltable frame from said upper horizontal position to said tilted position when said first set of actuators is secured with respect to said main frame and said second releasable means is released.

14. The combination as specified in claim 13 and releasable rigid means for maintaining the transverse spacing of said side members of said main frame.

15. In a trailer for handling normally ground supported receptacles having outwardly longitudinally extending horizontal elements fixedly attached to opposite sides thereof, a main frame including transversely spaced side frame members and a front cross member, transversely spaced wheels fastened to said side frame members of said main frame, a vertically movable frame on said main frame including a front cross member and transversely spaced side frame members each of which has an upwardly opening longitudinally extending support surface, the side frame members of the main frame and the vertically movable frame, respectively, bounding vertically unviolated aligned spaces therebetween accessible at an open end thereof to receive a receptacle to be transported and the vertically movable frame normally being in a lower horizontal position to be situated below and in spaced relation to said elements when said receptacle is ground supported and within said vertically aligned spaces, a plurality of actuators pivotally securing each of the side frame members of the vertically movable frame on the side frame members, respectively, of said main frame for movement of said vertically movable frame between its lower horizontal position and an upper horizontal position to bring said support surfaces of said side frame members of said vertically movable frame into engaged and lifting relationship with said elements, and hydraulic means including a pair of hydraulic cylinder-piston assemblies each pivotally mounted between one of the side members of the main frame and the corresponding side member of the vertically movable frame and operable through the instrumentality of said actuators to move the vertically movable frame between its lower and upper horizontal positions.

References Cited in the file of this patent

UNITED STATES PATENTS

| | | |
|---|---|---|
| 1,429,974 | Rogers | Sept. 26, 1922 |
| 2,219,525 | Maxon | Oct. 29, 1940 |
| 2,527,639 | Meyer | Oct. 24, 1950 |
| 2,672,247 | Jewett | Mar. 16, 1954 |
| 2,693,288 | Black | Nov. 2, 1954 |
| 2,784,853 | Bowles | Mar. 12, 1957 |